United States Patent
Cockburn et al.

(10) Patent No.: US 6,870,476 B2
(45) Date of Patent: Mar. 22, 2005

(54) CONTINUOUS FEEDBACK CONTAINER SECURITY SYSTEM

(75) Inventors: John Malcolm Cockburn, Richmond (CA); Clive A. Ross, West Vancouver (CA)

(73) Assignee: Bulldog Technologies Inc., Richmond (CA)

( * ) Notice: Subject to any disclaimer, the term of this patent is extended or adjusted under 35 U.S.C. 154(b) by 179 days.

(21) Appl. No.: 10/407,454

(22) Filed: Apr. 7, 2003

(65) Prior Publication Data

US 2004/0196153 A1 Oct. 7, 2004

(51) Int. Cl.⁷ ............................................. G08B 13/00
(52) U.S. Cl. .................. 340/541; 340/431; 340/539.22; 340/545.6; 340/546; 340/568.1
(58) Field of Search ................................. 340/541, 431, 340/521, 546, 545.1, 545.6, 568.1, 539.1, 539.22, 539.31

(56) References Cited

U.S. PATENT DOCUMENTS

| | | | |
|---|---|---|---|
| 3,618,067 A | 11/1971 | DeVale et al. ............... 340/282 |
| 4,260,982 A | 4/1981 | DeBenedictis et al. ...... 340/539 |
| 4,871,997 A | 10/1989 | Adrianssens et al. ....... 340/539 |
| 4,970,496 A | * 11/1990 | Kirkpatrick ............... 340/545.6 |
| 5,200,735 A | 4/1993 | Hines ......................... 340/539 |
| 5,349,329 A | 9/1994 | Smith ......................... 340/539 |
| 5,373,282 A | 12/1994 | Carter ........................ 340/539 |
| 5,565,858 A | 10/1996 | Guthrie |
| 5,627,520 A | 5/1997 | Ip et al. |
| 5,648,763 A | * 7/1997 | Long ...................... 340/825.49 |
| 5,682,139 A | 10/1997 | Pradeep et al. ............. 340/539 |
| 5,757,270 A | 5/1998 | Mori .......................... 340/568 |
| 5,831,531 A | 11/1998 | Tuttle |
| 5,939,980 A | 8/1999 | Heitmann et al. .......... 340/506 |
| 5,959,568 A | 9/1999 | Woolley ....................... 342/42 |
| 5,987,058 A | 11/1999 | Sanderford et al. ......... 375/208 |
| 6,011,473 A | 1/2000 | Klein .......................... 340/571 |
| 6,075,443 A | 6/2000 | Schepps et al. .......... 340/573.4 |
| 6,107,914 A | 8/2000 | Greene ....................... 340/426 |
| 6,137,402 A | 10/2000 | Marino ....................... 340/506 |

(List continued on next page.)

FOREIGN PATENT DOCUMENTS

| | | |
|---|---|---|
| DE | 3534806 | 4/1987 |
| EP | 1246094 | 10/2002 |
| GB | 2226170 | 6/1990 |
| WO | 01/69559 | 9/2001 |

*Primary Examiner*—Thomas Mullen
(74) *Attorney, Agent, or Firm*—Oyen Wiggs Green & Mutala (57) ABSTRACT

The invention provides a security system comprising a security apparatus and a monitoring unit which provide a user with real time security information. The security apparatus comprises a housing, a mounting bracket attached to the outside of the housing, the mounting bracket configured for attachment to a secured item and comprising a switch, the switch configured to produce a first indication when the mounting bracket is attached to the secured item and a second indication when the mounting bracket is removed from the secured item, a power source positioned inside the housing, a transceiver positioned inside the housing and connected to the power source and an electronic circuit positioned inside the housing and connected to the power source, the transceiver and the switch of the mounting bracket. The transceiver is configured for communication with the monitoring unit. The electronic circuit is programmed to enter an armed state when the first indication is produced by the switch, and programmed to cause the transceiver to periodically transmit an OK signal to the monitoring unit when in the armed state, unless at least one of a plurality of alarm events occurs. The plurality of alarm events comprises production of the second indication by the switch of the mounting bracket, loss of power to the transceiver and loss of power to the electronic circuit.

12 Claims, 7 Drawing Sheets

U.S. PATENT DOCUMENTS

| | | | |
|---|---|---|---|
| 6,150,923 A | 11/2000 | Johnson et al. | 340/384.6 |
| 6,281,793 B1 * | 8/2001 | Haimovich et al. | 340/545.1 |
| 6,384,709 B2 * | 5/2002 | Mellen et al. | 340/5.2 |
| 6,469,627 B1 | 10/2002 | Forster et al. | |
| 2004/0119588 A1 * | 6/2004 | Marks | 340/539.1 |
| 2004/0183673 A1 * | 9/2004 | Nageli | 340/539.13 |
| 2004/0189466 A1 * | 9/2004 | Morales | 340/539.26 |

* cited by examiner

FIG. 9

CONTINUOUS FEEDBACK CONTAINER SECURITY SYSTEM

TECHNICAL FIELD

This invention relates to a novel continuous feedback security system for containers and the cargo contained therein. More particularly, this invention pertains to a novel security apparatus which can be attached to a container and provides real time feedback to a monitoring unit.

BACKGROUND

In the past three decades or so, it has become the custom to ship goods in containers rather than ship the goods in separate units. These goods containing containers have standardized dimensions and are loaded on and off freighters and tractor trailers by cranes and other suitable equipment.

The use of containers in the shipping industry has become so great that there are over 20 million unlocked shipping containers in the world. Since the containers are unlocked, there is a strong temptation throughout the world to steal the valuable goods from the unlocked containers. International rings have become established. They focus on stealing and marketing the expensive stolen goods. Indeed, the problem of theft has become so great that there are over 10 billion dollars in reported losses from containers per annum in North America alone. The majority of illegal drugs are transported throughout the world in shipping containers. It has also become prevalent to transport illegal aliens in containers. Thousands of tractor-trailers hauling containers are stolen monthly. Container theft not only is costly but it causes lengthy delays in the delivery of goods. Losses are so high that many insurance companies refuse to insure against container theft and some container companies are forced to self-insure against container and container content theft.

SUMMARY OF INVENTION

The invention provides a security apparatus for use with a monitoring unit, the security apparatus comprising a housing, a mounting bracket attached to the outside of the housing, the mounting bracket configured for attachment to a secured item and comprising a switch, the switch configured to produce a first indication when the mounting bracket is attached to the secured item and a second indication when the mounting bracket is removed from the secured item, a power source positioned inside the housing, a transceiver positioned inside the housing and connected to the power source, the transceiver configured for communication with the monitoring unit, and, an electronic circuit positioned inside the housing and connected to the power source, the transceiver and the switch of the mounting bracket, the electronic circuit programmed to enter an armed state when the first indication is produced by the switch, and programmed to cause the transceiver to periodically transmit an OK signal to the monitoring unit when in the armed state unless at least one of a plurality of alarm events occurs, the plurality of alarm events comprising, production of the second indication by the switch of the mounting bracket, loss of power to the transceiver, and, loss of power to the electronic circuit.

The security apparatus may further comprise a vibration sensor positioned inside the housing and connected to the power source and the electronic circuit, the vibration sensor configured to produce a vibration signal if the security apparatus is moved in a predetermined manner, the plurality of alarm events further comprising production of the vibration signal, and, loss of power to the vibration sensor.

The security apparatus may further comprise a GPS sensor positioned inside the housing and connected to the power source, the GPS sensor configured to provide the electronic circuit with a location signal.

The electronic circuit may be programmed to compare the location signal with an initial location signal and to produce a displacement signal if the location signal differs from the initial location signal by a predetermined amount, the initial location signal comprising the location signal provided by the GPS sensor when the first indication is produced, and wherein the plurality of alarm events further comprise production of the displacement signal, and, loss of power to the GPS sensor.

The security apparatus may further comprise a sound sensor positioned inside the housing and connected to the power source and the electronic circuit, the sound sensor configured to produce a sound signal if a predetermined sound occurs near the security apparatus, the plurality of alarm events further comprising production of the sound signal and, loss of power to the sound sensor.

The mounting bracket may comprise a clip configured to snap onto a locking-rod. The security apparatus may further comprise a connector arm and a second clip for attaching to a second locking rod. The security apparatus may further comprise a locking mechanism attached to one of the clips for selectively locking said one of the clips onto the locking rod to which said one of the clips is attached.

The invention also provides a security system comprising a security apparatus, the security apparatus configured for attachment to a locking-rod of a container by means of a mounting bracket having a switch thereon, the security apparatus comprising a first power source, a first electronic circuit and a first transceiver, the switch configured to provide the electronic circuit with a first indication when the mounting bracket is attached to the locking-rod and a second indication when the mounting bracket is removed from the locking-rod, and, a monitoring unit, the monitoring unit comprising a second power source, a second electronic circuit and a second transceiver, wherein, upon receiving the first indication from the switch the first electronic circuit causes the first transceiver to periodically broadcast an OK signal to the second transceiver, and wherein the first electronic circuit is programmed to cause the first transceiver to broadcast an alarm signal upon at least one of receiving the second indication from the switch, receiving an alarm signal from the second transceiver, receiving a low power indication from the first power source, detecting vibration of the security apparatus, and, detecting displacement of the security apparatus in excess of a predetermined distance, and wherein the second electronic circuit is programmed to cause the second transceiver to broadcast an alarm signal upon at least one of failing to receive the OK signal from the first transceiver for a predetermined time period, receiving an alarm signal from the first transceiver, and, receiving a low power indication from the second power source.

The invention also provides a method of preventing tampering with a container having at least one locking rod, the method comprising attaching a security apparatus to a locking-rod, the security apparatus comprising a vibration sensor, a location sensor, a power source, a transceiver and an electronic circuit, the security apparatus configured to enter into an armed state when attached to the locking-rod, broadcasting OK signals from the transceiver when in the armed state, receiving the OK signals with a monitoring unit, the monitoring unit configured to broadcast an alarm signal if the monitoring unit fails to receive any OK signals for a predetermined time period, and, ceasing to broadcast OK signals from the security apparatus upon the occurrence of at least one of a plurality of alarm events, the plurality of alarm events comprising removal of the security apparatus from the locking-rod, vibration of the security apparatus, and, displacement of the security apparatus beyond a predetermined distance from a location where the security apparatus entered into the armed state, and, loss of power to any of the vibration sensor, the location sensor, the transceiver and the electronic circuit.

The method may further comprise the steps of broadcasting a confirmation signal from the monitoring unit upon receipt of each OK signal and receiving the confirmation signal by the transceiver, and wherein the plurality of alarm events further comprises failure of the transceiver to receive a confirmation signal for each OK signal broadcast by the transceiver.

BRIEF DESCRIPTION OF DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
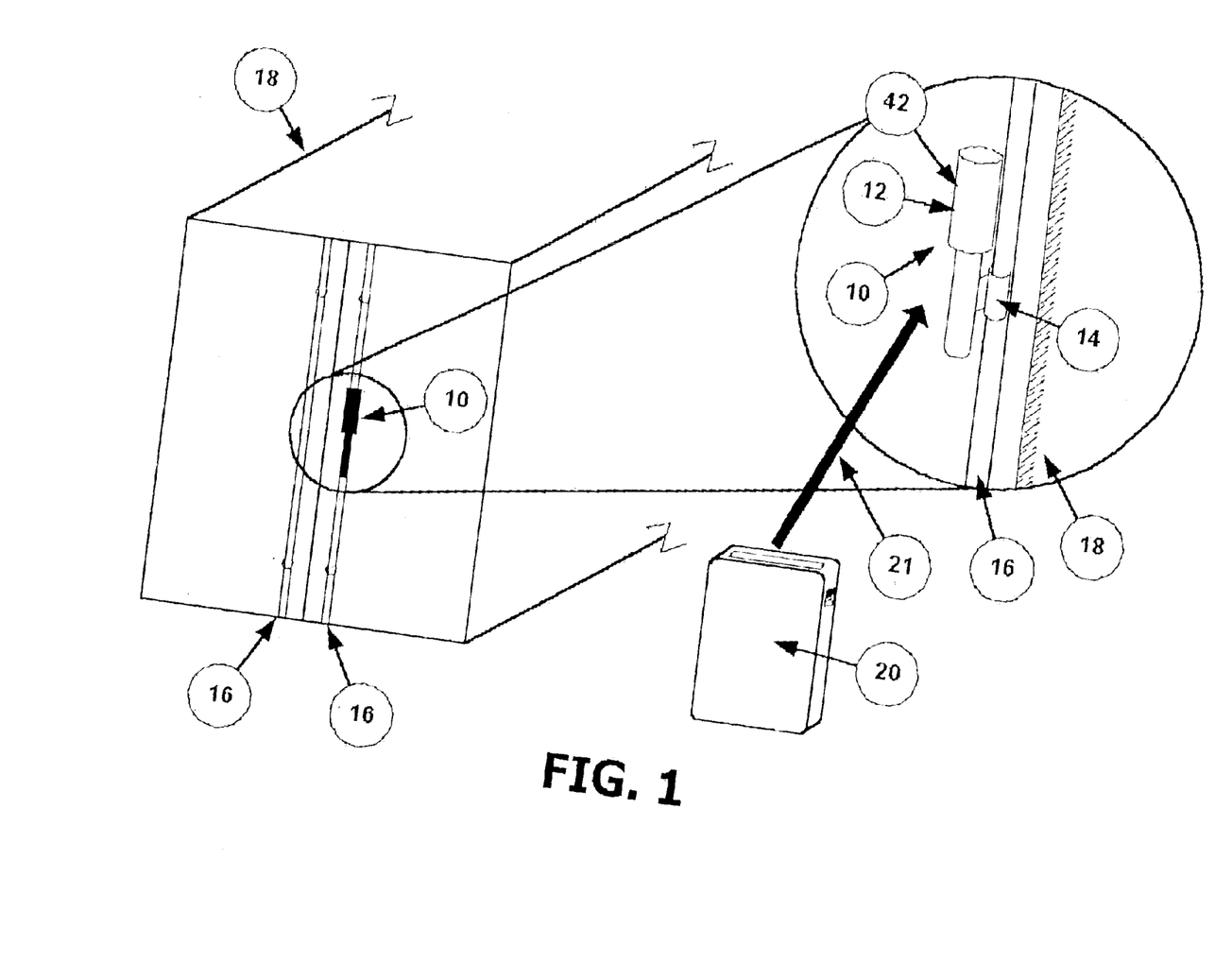
FIG. 1 illustrates a security system according to a preferred embodiment of the invention showing a monitoring unit and a security apparatus attached to a locking-rod of a container, with an exploded side view of the security apparatus attached to the locking-rod.

FIG. 1 shows a security apparatus 10 according to a preferred embodiment of the invention. Apparatus 10 comprises a housing 12 having mounting bracket 14 attached thereto. Mounting bracket 14 is attached to one of the rear locking-rods 16 of a container 18. Apparatus 10 is configured to communicate with a monitoring unit 20 by means of wireless signals 21, provided they are within a maximum range of approximately 1.5 miles of each other. The wireless signals 21 exchanged between apparatus 10 and monitoring unit 20 are preferably radio-frequency (RF) signals, and more preferably frequency hopped spread spectrum (FHSS) signals. FHSS signals are preferred because of their ease of use and low susceptibility to interception and interference.

Preferably, security apparatus 10 and monitoring unit 20 are also each configured for communication with a remote security station by means of a communications network (not shown). Once apparatus 10 is armed, the occurrence of any alarm event will cause both apparatus 10 and monitoring unit 20 to broadcast alarm signals to the remote security station. Security personnel at the security station will receive the alarm signals and thus be able to respond accordingly. Alternatively, the alarm signals may be broadcast directly to the local police in the area where container 18 is located.

Figures 2, 3:
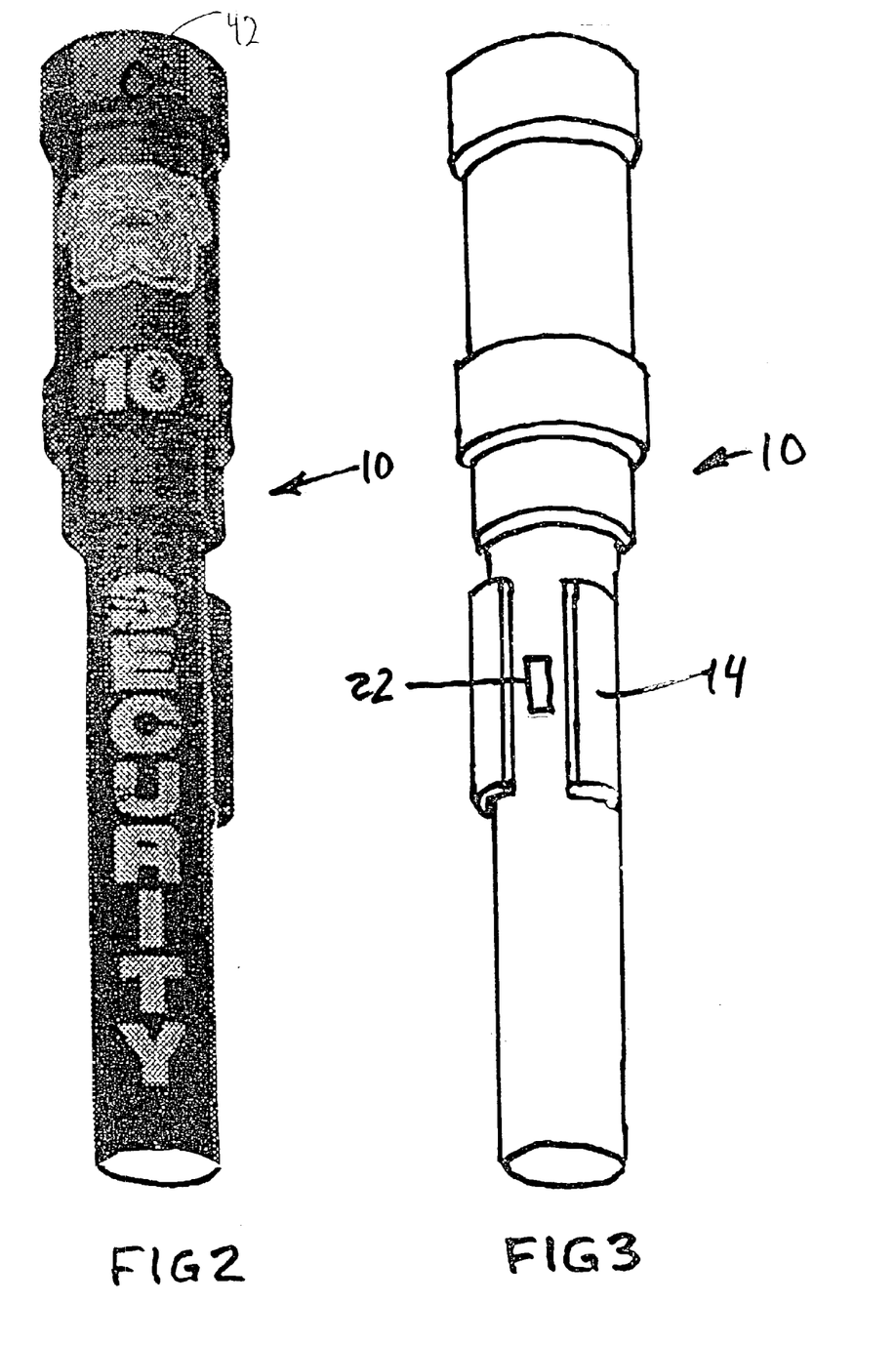
FIG. 2 illustrates a detailed front view of the security apparatus of FIG. 1.
FIG. 3 illustrates a detailed rear view of the security apparatus of FIG. 1.
Figure 4:
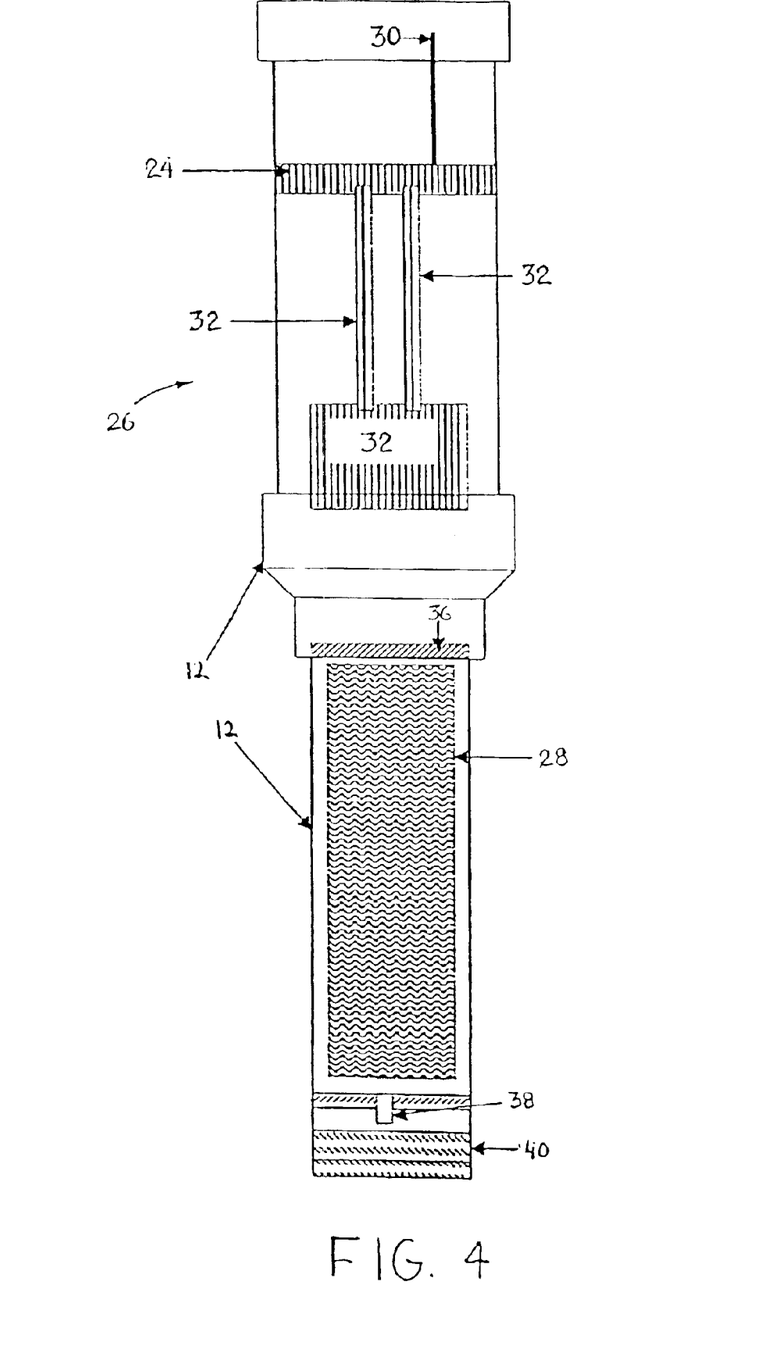
FIG. 4 illustrates a section view of the security apparatus of FIG. 1, illustrating the components of the security apparatus.

With reference to FIGS. 2 to 4, apparatus 10 preferably comprises transceiver 24, electronic circuit 26 and power source 28, all positioned within housing 12. Transceiver 24 may comprise antenna 30. Electronic circuit 26 may comprise a plurality of circuit boards 32. Power source 28 preferably comprises a battery or batteries. A shield 36 may be positioned in housing 12 between power source 28 and electronic circuit 26, to protect electronic circuit 26 from possible unexpected electrical discharge from power source 28. The end of housing near power source 12 preferably comprises a threaded endplug 40 to facilitate removal and replacement of power source 28. Charge pin 38 is preferably located in endplug 40 and in electrical contact with power source 28 in order to provide electrical power to transceiver 24 and electronic circuit 26 by means of conductors (not shown) in the walls of housing 12. Power source 28 preferably comprises a C-cell battery pack.

Mounting bracket 14 preferably comprises a partially cylindrical clip configured to snap onto locking rod 16. A switch 22 is located on the inside of mounting bracket 14 such that when mounting bracket 14 is attached to locking rod 16, switch 22 is depressed. Switch 22 is coupled to electronic circuit 26 so that when switch 22 is depressed by attachment of mounting bracket 14 to locking rod 16, electronic circuit 26 enters into an armed state. Once electronic circuit enters into the armed state, it will remain in the armed state until the occurrence of an alarm event, or until a disarm signal is received by transceiver 24, as described below. If mounting bracket 14 is removed from locking rod 16, switch 22 is no longer depressed. Removal of mounting bracket 14 from locking rod 16 comprises an alarm event.

When in the armed state, electronic circuit 26 is configured to cause transceiver 24 to broadcast OK signals (which are preferably FHSS signals) to monitoring unit 20, preferably continuously at a predetermined rate which may be selected by a user. Apparatus 10 may also comprise a light emitting diode (LED) 42 coupled to electronic circuit 26 so that LED 42 flashes when electronic circuit 26 is in the armed state.

Figures 5, 6:
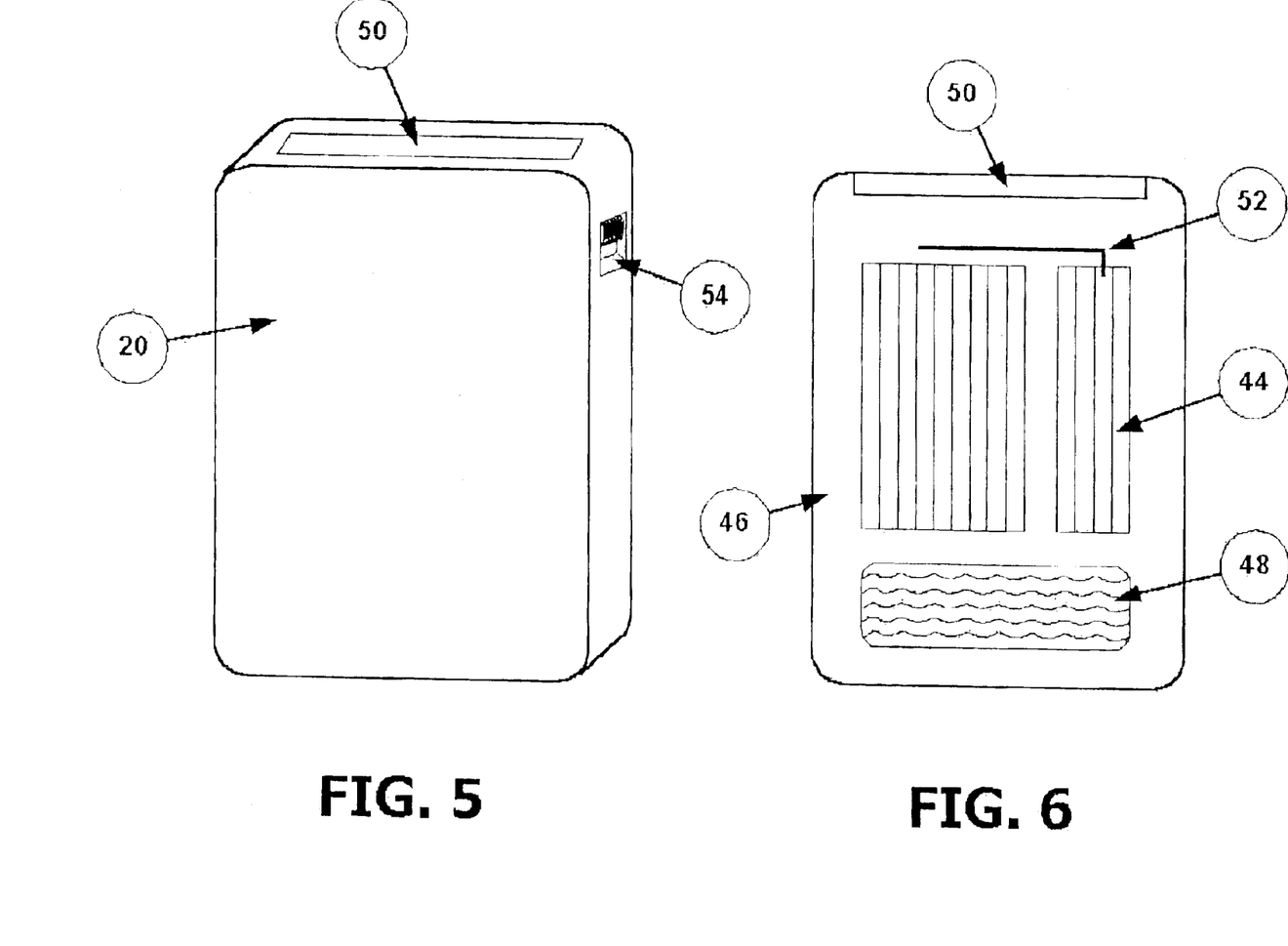
FIG. 5 illustrates a detailed front view of the monitoring unit of FIG. 1.
FIG. 6 illustrates a section view of the monitoring unit of FIG. 1, illustrating the components of the monitoring unit.
Figure 7:
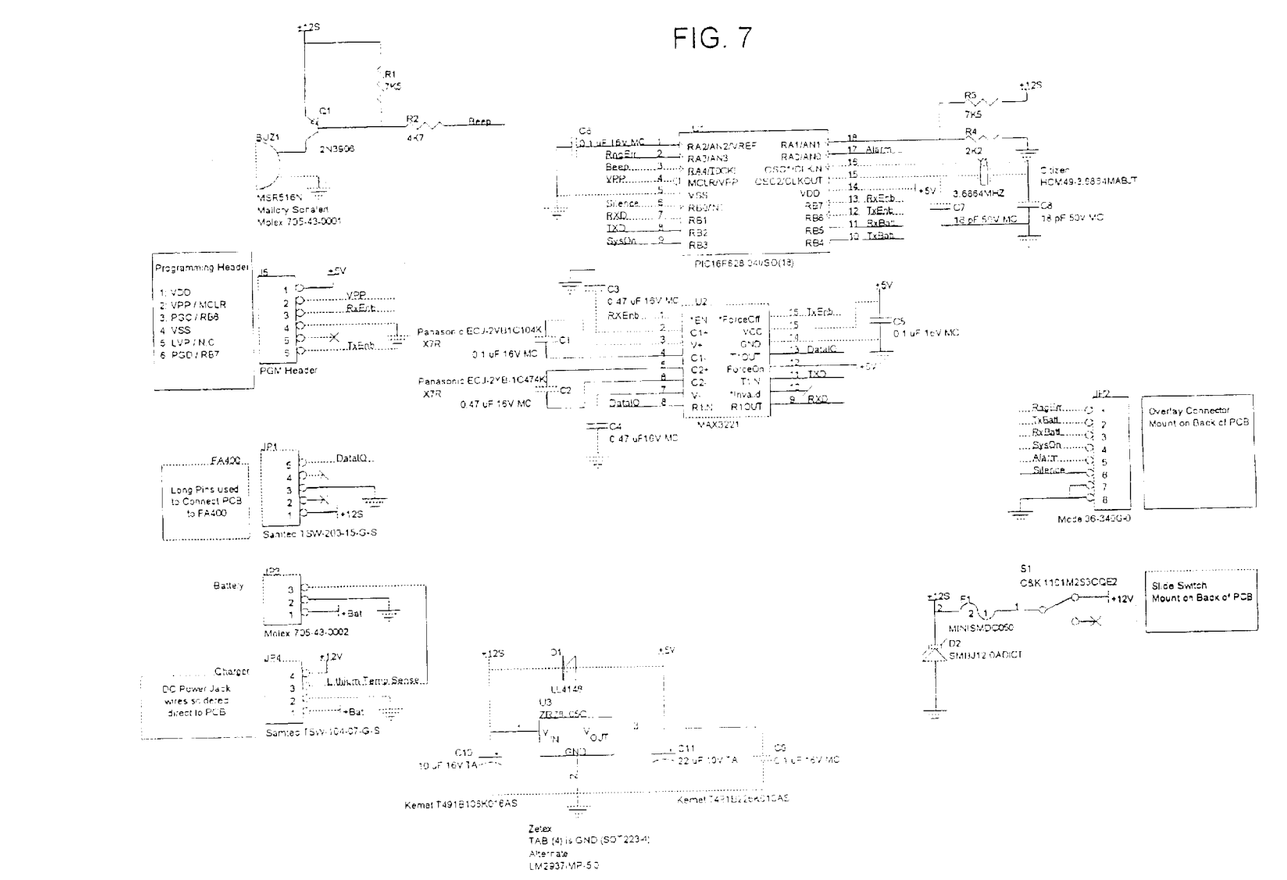
FIG. 7 depicts a circuit diagram of a preferred embodiment of the monitoring unit according to the invention.

Referring to FIGS. 5 and 6, monitoring unit 20 may comprise a pager, sized to fit into a user's pocket. With reference to FIGS. 5 and 6, monitoring unit 20 preferably comprises transceiver 44, electronic circuit 46, power source 48 and display 50. Display 50 may comprise a plurality of LEDs (not shown) to indicate the status of monitoring unit 20 and security apparatus 10, such as: OK status; an alarm event; a loss of signal; and a low battery condition for either monitoring unit 20 or security apparatus 10. The power source 48 preferably comprises a battery that may be recharged from a vehicle's cigarette lighter. Transceiver 44 may comprise an antenna 52. FIG. 7 depicts a circuit diagram of a preferred embodiment of monitoring unit 20.

Once transceiver 44 has received an OK signal from apparatus 10, electronic circuit 46 enters into an armed state. Electronic circuit 46 remains in the armed state until the occurrence of an alarm event, or until monitoring unit is disarmed. When in the armed state, electronic circuit 46 monitors transceiver 44 for receipt of OK signals broadcast from apparatus 10. Electronic circuit 46 may be configured to cause transceiver 44 to broadcast a confirmation signal to transceiver 24 upon receipt of each OK signal. Failure of transceiver 44 to receive an OK signal from transceiver 24 for a predetermined time period comprises an alarm event. The predetermined time period is preferably approximately 5 seconds. In embodiments where transceiver 44 broadcasts confirmation signals, failure of transceiver 24 to receive a confirmation signal from transceiver 44 after broadcasting each OK signal comprises an alarm event.

Electronic circuit 46 is preferably configured to output information about monitoring unit 20 and security apparatus 10 to display 50. Information output to display 50 may include the status of power sources 28, 48, and an indication of whether or not security apparatus 10 is within the maximum range of monitoring unit 20.

Monitoring unit 20 preferably comprises a power switch 54. Power switch 54 is in the ON position when monitoring unit 20 is in use. Moving power switch 54 to the OFF position causes electronic circuit 46 to enter a disarmed state, which disarms monitoring unit 20. Disarming of monitoring unit 20 causes transceiver 44 to send a disarm signal to transceiver 24 before shutting off the power to transceiver 44 and electronic circuit 46. When transceiver 24 receives the disarm signal from transceiver 44, electronic circuit 26 enters into a disarmed state.

The occurrence of any alarm event causes electronic circuits 26, 46 to enter into an alarm state. When in the alarm state, electronic circuits 26, 46 are configured to cause transceivers 24, 44, respectively, to broadcast alarm signals (which are preferably FHSS signals) to a security station at a remote location, preferably by means of a satellite communications network. Alternatively, the alarm signals may be broadcast directly to the local police in the area where container 18 is located. The alarm signals are preferably broadcast continuously. No OK signals are broadcast when electronic circuits 26, 46 are in alarm mode. The alarm signals preferably comprise real time information about apparatus 10 and monitoring unit 20 such as a unique identification code for apparatus 10 and monitoring unit 20, as well as the location of apparatus 10 and monitoring unit 20.

Apparatus 10 may also comprise a noise generator (not shown), such as a siren, coupled to electronic circuit 26 and configured to be sounded when electronic circuit 26 is in the alarm state. Likewise, monitoring unit 20 may comprise a noise generator (not shown), such as a buzzer, coupled to electronic circuit 46 and configured to be sounded when electronic circuit 46 is in the alarm state.

Figure 8:
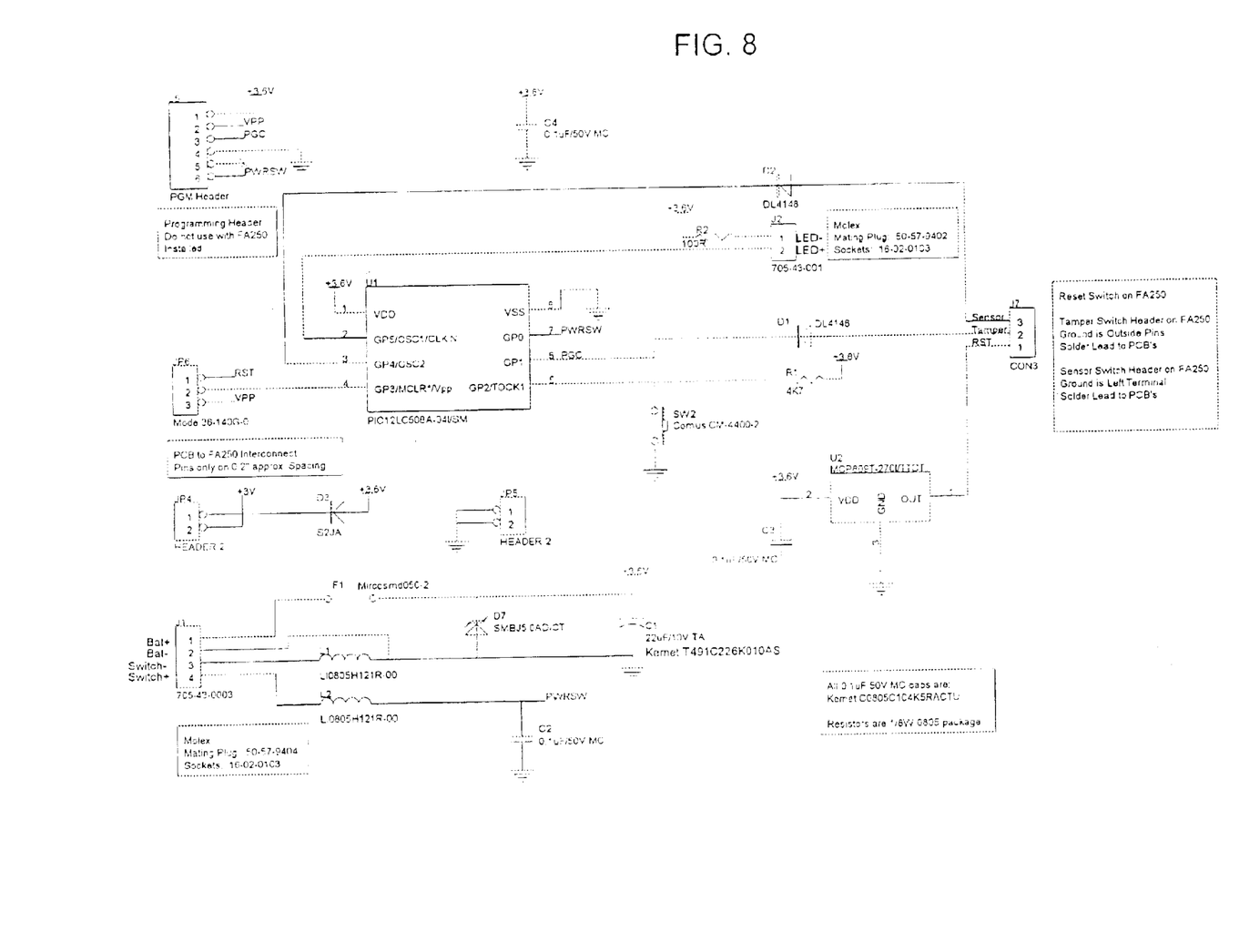
FIG. 8 depicts a circuit diagram of a preferred embodiment of a vibration sensor according to the invention.

Electronic circuit 26 of apparatus 10 may include a vibration sensor. FIG. 8 depicts a circuit diagram of a preferred embodiment of the vibration sensor. The vibration sensor is preferably configured to produce a vibration signal if apparatus 10 vibrates. The vibration sensor may also be configured to produce a vibration signal if apparatus 10 is tilted beyond a predetermined angle. The vibration sensor also preferably includes software which allows a user to adjust the sensitivity of the sensor, so that minor vibration and/or tilting will not produce a vibration signal. This is particularly useful when security apparatus 10 is armed during transport of the container. Production of a vibration signal comprises an alarm event.

Electronic circuit 26 of apparatus 10 may optionally also include a sound sensor. The sound sensor is preferably configured to produce a sound signal if drilling or other distinctively noisy activity occurs in the vicinity of apparatus 10. Production of a sound signal comprises an alarm event.

Electronic circuit 26 may also include a Global Positioning System (GPS) sensor. The GPS sensor 70 is configured to provide electronic circuit 26 with a location signal. When electronic circuit 26 enters the armed state, electronic circuit 26 reads an initial location signal from the GPS sensor and determines an arming location of apparatus 10. Electronic circuit 26 periodically checks the location signal from the GPS sensor, and will produce a displacement signal if the location signal from the GPS sensor indicates that apparatus 10 has moved more than a predetermined distance, preferably about 200 feet, from the arming location. The displacement signal may comprise information about the location and speed of apparatus 10. Production of a displacement signal comprises an alarm event.

Figure 9:
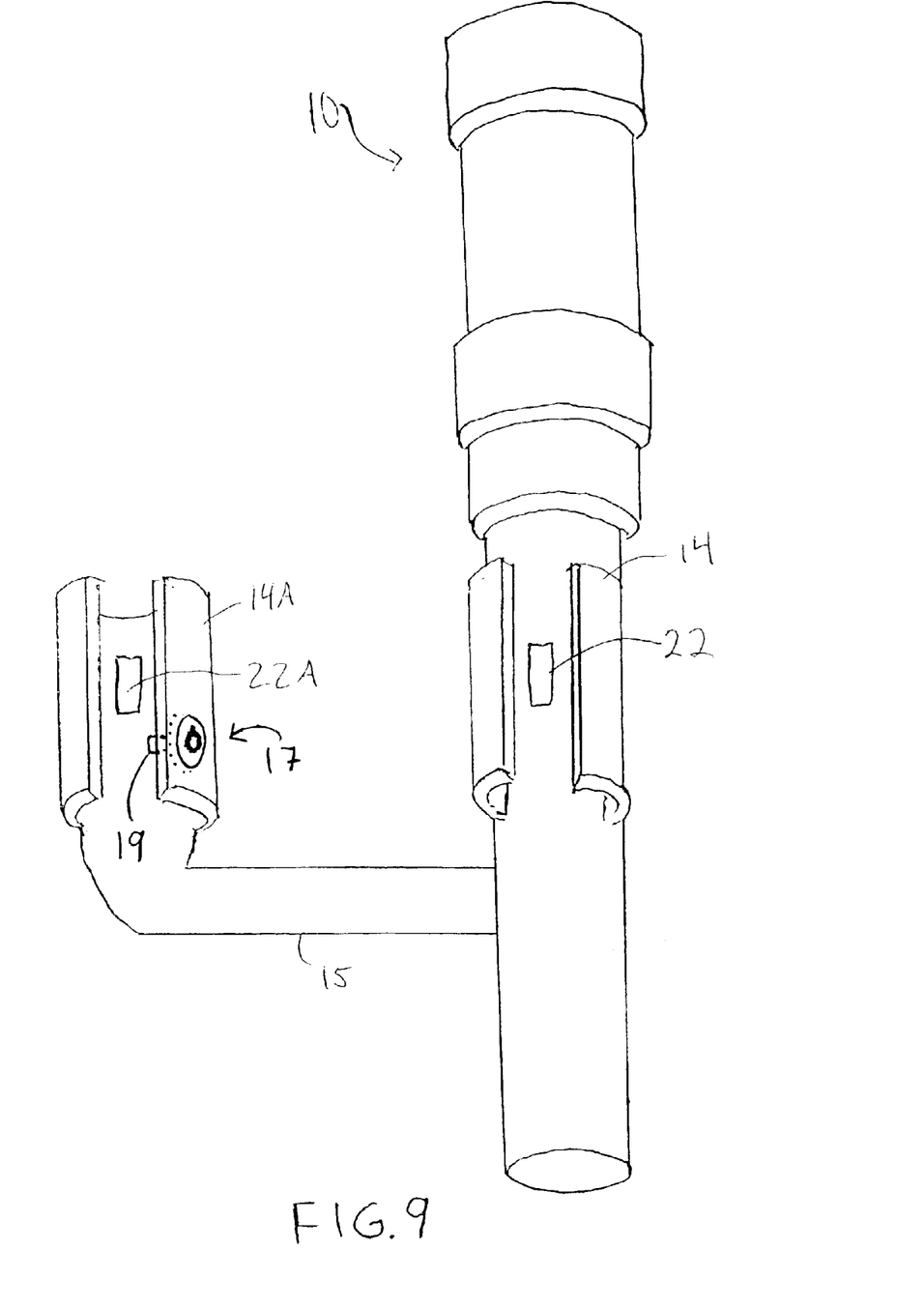
FIG. 9 illustrates a security apparatus configured for attachment to two locking-rods, according to another embodiment of the invention.

FIG. 9 illustrates an alternate embodiment of security apparatus 10, configured to attach to both locking-rods 16 of container 14. Apparatus 10 of FIG. 9 is the same as the embodiment shown in FIGS. 1 to 4, except that the FIG. 9 apparatus further comprises a connector arm 15, second mounting bracket 14A and second switch 22A. Second switch 22A is coupled to electronic circuit 26 just as is switch 22, so that removal of either or both of the mounting brackets 14, 14A comprises an alarm event. The FIG. 9 embodiment has particular application for maintaining security of containers in transit, as the owner of the goods in a container may be provided with monitoring unit 20 so as to receive real time information about the location of the container and any attempts to open the container, either by the driver or others.

FIG. 9 also illustrates a locking mechanism 17 attached to mounting bracket 14A. It is to be understood that locking mechanism 17 could also be attached to mounting bracket 14 in either the FIG. 9 embodiment or the embodiment of FIGS. 2 to 4. Locking mechanism 17 comprises a pin 19 moveable between an open position wherein pin 19 is flush with the inner surface of bracket 14A, and a locked position wherein pin 19 extends inward from the inner surface of bracket 14A into a correspondingly shaped hole in locking rod 16 (not shown). Movement of pin 19 is preferably accomplished by turning a key (not shown).

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A security apparatus for use with a monitoring unit, the security apparatus comprising:
   (a) a housing;
   (b) a mounting bracket attached to the outside of the housing, the mounting bracket configured for attachment to a secured item and comprising a switch, the switch configured to produce a first indication when the mounting bracket is attached to the secured item and a second indication when the mounting bracket is removed from the secured item;
   (c) a power source positioned inside the housing;

(d) a transceiver positioned inside the housing and connected to the power source, the transceiver configured for communication with the monitoring unit; and, (e) an electronic circuit positioned inside the housing and connected to the power source, the transceiver and the switch of the mounting bracket, the electronic circuit programmed to enter an armed state when the first indication is produced by the switch, and programmed to cause the transceiver to periodically transmit an OK signal to the monitoring unit when in the armed state unless at least one of a plurality of alarm events occurs, the plurality of alarm events comprising:

(i) production of the second indication by the switch of the mounting bracket;
(ii) loss of power to the transceiver; and,
(iii) loss of power to the electronic circuit.

2. The security apparatus of claim 1 further comprising a vibration sensor positioned inside the housing and connected to the power source and the electronic circuit, the vibration sensor configured to produce a vibration signal if the security apparatus is moved in a predetermined manner, the plurality of alarm events further comprising:

(i) production of the vibration signal; and,
(ii) loss of power to the vibration sensor.

3. The security apparatus of claim 1 wherein the mounting bracket comprises a clip configured to snap onto a locking-rod.

4. The security apparatus of claim 3 further comprising a connector arm and a second clip for attaching to a second locking rod.

5. The security apparatus of claim 4 further comprising a locking mechanism attached to one of the clips for selectively locking said one of the clips onto the locking rod to which said one of the clips is attached.

6. The security apparatus of claim 3 further comprising a locking mechanism attached to the clip for selectively locking the clip onto the locking rod.

7. The security apparatus of claim 1 further comprising a GPS sensor positioned inside the housing and connected to the power source, the GPS sensor configured to provide the electronic circuit with a location signal.

8. The security apparatus of claim 7 wherein the electronic circuit is programmed to compare the location signal with an initial location signal and to produce a displacement signal if the location signal differs from the initial location signal by a predetermined amount, the initial location signal comprising the location signal provided by the GPS sensor when the first indication is produced, and wherein the plurality of alarm events further comprise:

(i) production of the displacement signal; and,
(ii) loss of power to the GPS sensor.

9. The security apparatus of claim 1 further comprising a sound sensor positioned inside the housing and connected to the power source and the electronic circuit, the sound sensor configured to produce a sound signal if a predetermined sound occurs near the security apparatus, the plurality of alarm events further comprising:

(i) production of the sound signal; and,
(ii) loss of power to the sound sensor.

10. A security system comprising:

(a) a security apparatus, the security apparatus configured for attachment to a locking-rod of a container by means of a mounting bracket having a switch thereon, the security apparatus comprising a first power source, a first electronic circuit and a first transceiver, the switch configured to provide the electronic circuit with a first indication when the mounting bracket is attached to the locking-rod and a second indication when the mounting bracket is removed from the locking-rod; and, (b) a monitoring unit, the monitoring unit comprising a second power source, a second electronic circuit and a second transceiver;

wherein, upon receiving the first indication from the switch the first electronic circuit causes the first transceiver to periodically broadcast an OK signal to the second transceiver, and wherein the first electronic circuit is programmed to cause the first transceiver to broadcast an alarm signal upon at least one of:

(i) receiving the second indication from the switch;
(ii) receiving an alarm signal from the second transceiver;
(iii) receiving a low power indication from the first power source;
(iv) detecting vibration of the security apparatus; and,
(v) detecting displacement of the security apparatus in excess of a predetermined distance;

and wherein the second electronic circuit is programmed to cause the second transceiver to broadcast an alarm signal upon at least one of:

(vi) failing to receive the OK signal from the first transceiver for a predetermined time period;
(vii) receiving an alarm signal from the first transceiver; and,
(viii) receiving a low power indication from the second power source.

11. A method of preventing tampering with a container having at least one locking rod, the method comprising:

(a) attaching a security apparatus to a locking-rod, the security apparatus comprising a vibration sensor, a location sensor, a power source, a transceiver and an electronic circuit, the security apparatus configured to enter into an armed state when attached to the locking-rod;

(b) broadcasting OK signals from the transceiver when in the armed state;

(c) receiving the OK signals with a monitoring unit, the monitoring unit configured to broadcast an alarm signal if the monitoring unit fails to receive any OK signals for a predetermined time period; and, (d) ceasing to broadcast OK signals from the security apparatus upon the occurrence of at least one of a plurality of alarm events, the plurality of alarm events comprising:

(i) removal of the security apparatus from the locking-rod;
(ii) vibration of the security apparatus; and
(iii) displacement of the security apparatus beyond a predetermined distance from a location where the security apparatus entered into the armed state; and
(iv) loss of power to any of the vibration sensor, the location sensor, the transceiver and the electronic circuit.

12. The method of claim 11 further comprising the steps of broadcasting a confirmation signal from the monitoring unit upon receipt of each OK signal and receiving the confirmation signal by the transceiver, and wherein the plurality of alarm events further comprises failure of the transceiver to receive a confirmation signal for each OK signal broadcast by the transceiver.

* * * * *